United States Patent
Hashimoto et al.

(10) Patent No.: US 9,027,279 B2
(45) Date of Patent: May 12, 2015

(54) PLANT CULTIVATION DEVICE AND FEED-WATER CONTROL METHOD

(75) Inventors: Masaki Hashimoto, Ibaraki (JP); Makoto Nomachi, Takatsuki (JP)

(73) Assignee: Suntory Holdings Limited, Osaka (JP)

(*) Notice: Subject to any disclaimer, the term of this patent is extended or adjusted under 35 U.S.C. 154(b) by 401 days.

(21) Appl. No.: 13/512,096

(22) PCT Filed: Nov. 30, 2010

(86) PCT No.: PCT/JP2010/071323
§ 371 (c)(1),
(2), (4) Date: Aug. 17, 2012

(87) PCT Pub. No.: WO2011/065557
PCT Pub. Date: Jun. 3, 2011

(65) Prior Publication Data
US 2012/0297675 A1 Nov. 29, 2012

(30) Foreign Application Priority Data
Nov. 30, 2009 (JP) ................................ 2009-272838

(51) Int. Cl.
*A01G 1/00* (2006.01)
*A01G 27/02* (2006.01)

(52) U.S. Cl.
CPC ............... *A01G 1/002* (2013.01); *A01G 27/02* (2013.01)

(58) Field of Classification Search
CPC .............................. A01G 27/00; A01G 31/02
USPC ........................................ 47/64, 59 R, 79, 80
See application file for complete search history.

(56) References Cited

U.S. PATENT DOCUMENTS

| D644,559 S | 9/2011 | Hashimoto |
| D644,562 S | 9/2011 | Hashimoto |
| 2002/0088177 A1* | 7/2002 | Gergek ............................. 47/79 |

(Continued)

FOREIGN PATENT DOCUMENTS

| JP | 61-9230 A | 1/1986 |
| JP | 5-55863 U | 7/1993 |

(Continued)

OTHER PUBLICATIONS

U.S. Appl. No. 13/511,492 to Masaki Hashimoto, filed May 23, 2012.
(Continued)

*Primary Examiner* — Monica Williams
(74) *Attorney, Agent, or Firm* — Greenblum & Bernstein, P.L.C.

(57) ABSTRACT

A plant cultivation device and feed-water control method, in which a detected moisture amount to start watering and a water amount to be used per watering are easily determined, includes a plant cultivation container for pooling plant cultivation water; a water-absorbing plant cultivation bed material; a feed-water device for supplying the plant cultivation water to the plant cultivation container; a first moisture sensor for detecting moisture around an immersed part of the plant cultivation bed material; a second moisture sensor for detecting moisture around a growth part of the plant cultivation bed material where a root of a plant is received; and a controller for supplying water when values detected by both of the first and second moisture sensors are below respective reference values, and for stopping water supply when a value detected by either the first or second moisture sensor is above the corresponding reference value.

10 Claims, 7 Drawing Sheets

(56) References Cited

U.S. PATENT DOCUMENTS

| | | |
|---|---|---|
| 2008/0097653 A1* | 4/2008 | Kaprielian et al. .......... 700/284 |
| 2009/0260282 A1 | 10/2009 | Hashimoto et al. |
| 2011/0214345 A1* | 9/2011 | Rasschaert .................... 47/40.5 |
| 2012/0297675 A1* | 11/2012 | Hashimoto et al. ............... 47/64 |
| 2012/0297677 A1* | 11/2012 | Hashimoto ...................... 47/80 |

FOREIGN PATENT DOCUMENTS

| | | |
|---|---|---|
| JP | 6-319389 A | 11/1994 |
| JP | 8-140508 A | 6/1996 |
| JP | 2003-265056 A | 9/2003 |
| JP | 2004-8169 A | 1/2004 |
| JP | 2005-65549 A | 3/2005 |
| JP | 2006-345761 A | 12/2006 |
| JP | 2008-113653 A | 5/2008 |
| WO | 2007/063815 A1 | 6/2007 |

OTHER PUBLICATIONS

WIPO Report on Patentability dated Jul. 19, 2012, English language translation.

* cited by examiner

PLANT CULTIVATION DEVICE AND FEED-WATER CONTROL METHOD

TECHNICAL FIELD

The present invention relates to a plant cultivation device including: a plant cultivation container having a water reservoir portion for pooling plant cultivation water; a water-absorbing plant cultivation bed material disposed in the plant cultivation container; a moisture sensor for detecting a moisture amount in the plant cultivation bed material; and a controller for controlling water supply to the water reservoir portion based on a detection value of the moisture sensor, and to a feed-water control method.

BACKGROUND ART

As prior art documents for this type of the plant cultivation device, there can be mentioned Patent Document 1 which is shown below. The plant cultivation device described in Patent Document 1 includes: a nozzle for watering a plant in a pot with water in a water tank from above; and a moisture sensor for detecting a moisture amount in soil where plant is grown, and performs watering from the nozzle based on a detection value of the sensor. It alleges that, therefore, the plant will not die due to deficiency of water, even after a long-term absence of care.

CITATION LIST

Patent Literature

Patent Document 1: Japanese Unexamined Patent Application Publication No. 6-319389 (paragraph 0020 and FIG. 1)

SUMMARY OF INVENTION

Technical Problem

However, in the plant cultivation device described in Patent Document 1, watering is performed from above the soil (plant cultivation bed material), and a time lag occurs before a change in the soil moisture amount is detected by the moisture sensor buried in the soil. As a result, even though the moisture amount in the soil moistened by the watering is detected by the moisture sensor and the watering is completed, a phenomenon in which moisture around a root keeps increasing is likely to occur. As a result, there has been a problem that the soil is likely to be in a state with excessive moisture which is not preferable for growth of most of the plants. It should be noted that, a method in which the moisture sensor is shallowly buried for the purpose of eliminating the time lag is not necessarily effective, since it becomes difficult to detect an actual moisture amount in the soil.

In addition, knowledge and skill of high level are necessary for determining, to each type of plant, the depth of the soil at which the moisture sensor is buried, in order to grow the plant healthily.

Further, in such a plant cultivation device, it is necessary to artificially determine in advance, at least, a percentage of the detected moisture amount at which the watering should be started, and a water amount to be used per watering. However, in the case of the plant cultivation device described in Patent Document 1, these values vary to a large extent depending on the burial depth of the moisture sensor, a water absorption speed of the plant, a water absorption speed and water-absorbing capacity of the soil (plant cultivation bed material), and properties (e.g. humidity and temperature) of an environment where the plant cultivation device is placed. As a result, there has been a problem that the determination should be eventually made based on trial and errors.

In view of the above-described problems of the conventional plant cultivation device, an object of the present invention is to provide a plant cultivation device in which the soil (plant cultivation bed material) is unlikely to be in a state with excessive moisture.

Another object of the present invention is to provide a plant cultivation device in which the burial depth of the moisture sensor is relatively easily determined, and the detected moisture amount to start the watering and the water amount to be used per watering are easily determined, without paying too much attention to the water absorption speed of the plant, the water absorption speed and water-absorbing capacity of the soil (plant cultivation bed material), and the properties (e.g. humidity and temperature) of the environment where the plant cultivation device is placed.

Solution to Problem

A first feature of the plant cultivation device according to the present invention lies in that the plant cultivation device includes: a plant cultivation container having a water reservoir portion for pooling plant cultivation water; a water-absorbing plant cultivation bed material disposed in the plant cultivation container; a feed-water device for supplying the plant cultivation water to the water reservoir portion; a first moisture sensor for detecting a moisture amount around an immersed part of the plant cultivation bed material immersed in the plant cultivation water of the water reservoir portion or a water amount in the water reservoir portion; a second moisture sensor for detecting a moisture amount around a growth part of the plant cultivation bed material where a root of a plant is received; and a controller for allowing the feed-water device to supply water when values detected by both the first moisture sensor and the second moisture sensor are below respective reference values, and for stopping water supply when a value detected by one of the first moisture sensor and the second moisture sensor is above the corresponding reference value.

In the first feature of the plant cultivation device according to the present invention, the watering is not performed from above the plant cultivation bed material, and the plant cultivation water is absorbed up from the immersed part below the growth part where the root of the plant is present in the plant cultivation bed material, and further, water supply is stopped when the moisture amount of the immersed part of the plant cultivation bed material exceeds the reference value of the same part. Accordingly, after the watering is completed, the phenomenon in which the moisture around the root keeps increasing is unlikely to occur, and the soil is unlikely to be in a state with excessive moisture. As a result, a soil condition in which the moisture is relatively low but never depleted, which is preferable for the growth of the most plants, can be easily retained at all times.

In addition, in the plant cultivation device according to the first feature of the present invention, the plant cultivation water is absorbed up from the immersed part located downward, and is moved at a low speed by a capillary action toward the growth part where the root of the plant is present. Therefore, regardless of the position of the moisture sensor buried near the root of the plant, the moisture sensor can detect the moisture amount around the root of the plant without a large time lag. Accordingly, it is not necessary to meticulously examine the burial depth of the moisture sensor.

Further, once the immersed part of the plant cultivation bed material is moistened and the water supply is stopped, the moisture of the immersed part is gradually diffused and a part of the diffused moisture reaches the growth part, but water is never supplied until the growth part goes into a dry state again. Therefore, as a result, the immersed part of the plant cultivation bed material is nearly depleted periodically, and thus the problem of propagation of slugs, mosquito larvae or the like, is unlikely to occur, which would otherwise by caused by a long-term excessive moisture state of the immersed part of the plant cultivation bed material. Furthermore, when it rains before the growth part goes into a dry state, moistening of the growth part by the rainfall postpones the start of water supply and thus water resource can be saved by that amount.

In addition, in the plant cultivation device according to the first feature of the present invention, a speed of water movement from the immersed part to the growth part of the plant cultivation bed material and a length of time required for depleting the immersed part may be changed due to the variations of a magnitude of the water absorption speed of the plant, the water absorption speed and water-absorbing capacity of the soil (plant cultivation bed material), the properties (e.g. humidity and temperature) of the environment where the plant cultivation device is placed. However, an influence of these changes is merely a shortening or prolongation of the time period before the values below the respective reference values are detected by both the first and second moisture sensors, and the moisture amount of the growth part itself is not really affected. Therefore, it becomes unnecessary to greatly alter the detected moisture amount to start the watering and the water amount to be used per watering, in accordance with these variable factors.

Another feature of the present invention lies in that the controller includes a first time period measuring means for measuring a time period during which water is continuously supplied by the feed-water device, and when a time period measured by the first time period measuring means exceeds a predetermined base time, forced water stop is performed in which the water supply is stopped.

With this configuration, even in the case where the sensor is malfunctioning and the controller determines that the moisture is not satisfactory though the plant cultivation bed material is moistened, excessive moistening of the plant cultivation bed material is suppressed by forced water stoppage in which water supply is stopped once.

Another feature of the present invention lies in that the controller includes a second time period measuring means for measuring a continuous drying time during which both of the first moisture sensor and the second moisture sensor continuously detect moisture detection values below respective reference values, and when a time period measured by the second time period measuring means exceeds a predetermined base time, a warning is issued.

With this configuration, even in the case where the sensor is malfunctioning and the controller determines that the moisture is not satisfactory though the plant cultivation bed material is moistened, excessive moistening of the plant cultivation bed material is suppressed by issuing a warning to check the sensor or the like.

DESCRIPTION OF EMBODIMENTS

Hereinbelow, embodiments of the present invention will be described with reference to the drawings.

Figure 1:
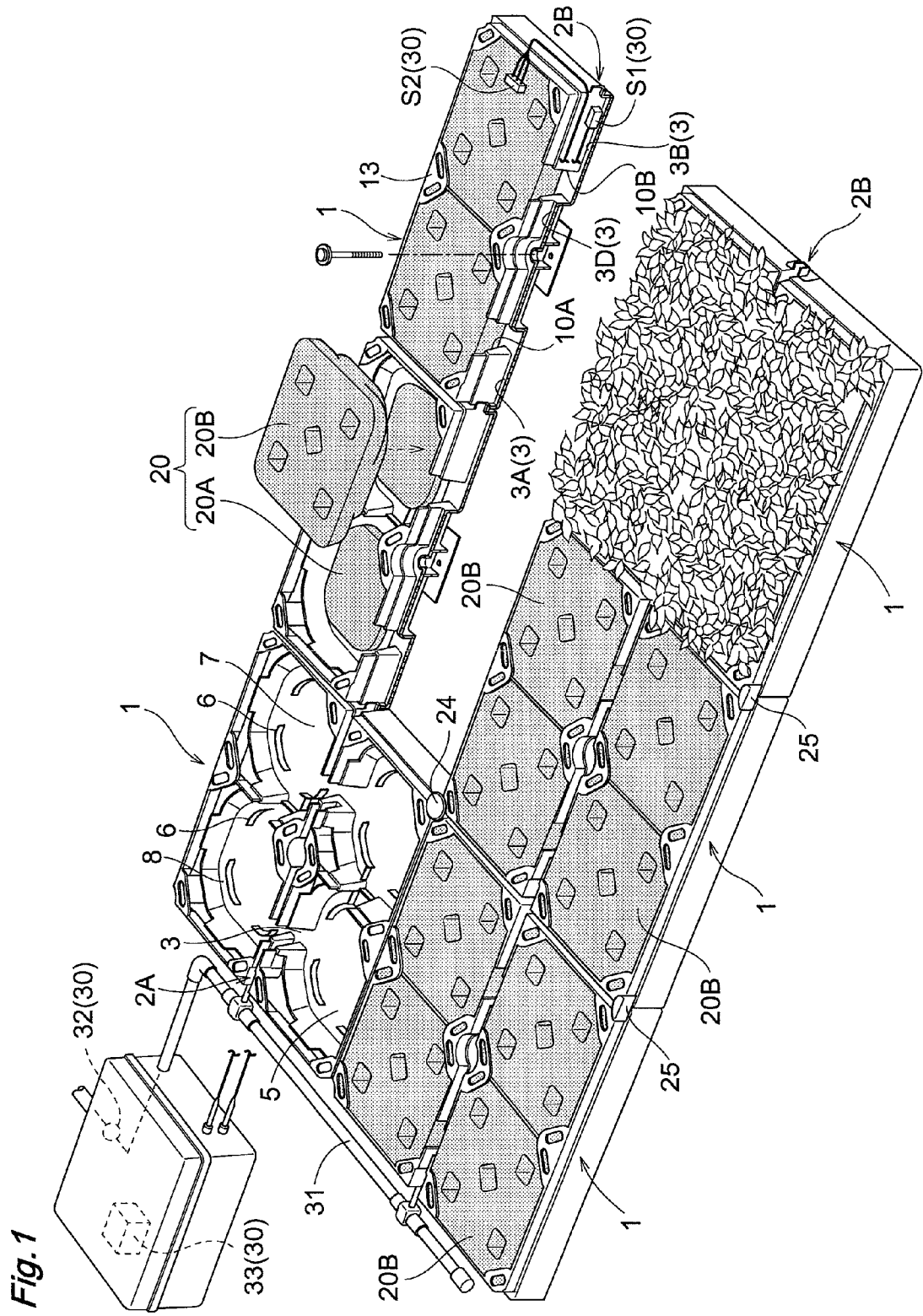
FIG. 1 is a perspective view of a plant cultivation device according to the present invention.

FIG. 1 is one example of the plant cultivation device placeable outdoors, such as on a roof top of a building, and includes: a plurality of plant cultivation containers 1 each integrally formed of resin; plant cultivation bed materials 20 each disposed in the plant cultivation container 1; and a feed-water equipment 30 for supplying the plant cultivation water to the plant cultivation containers 1.

Configuration of Plant Cultivation Container

Figure 2:
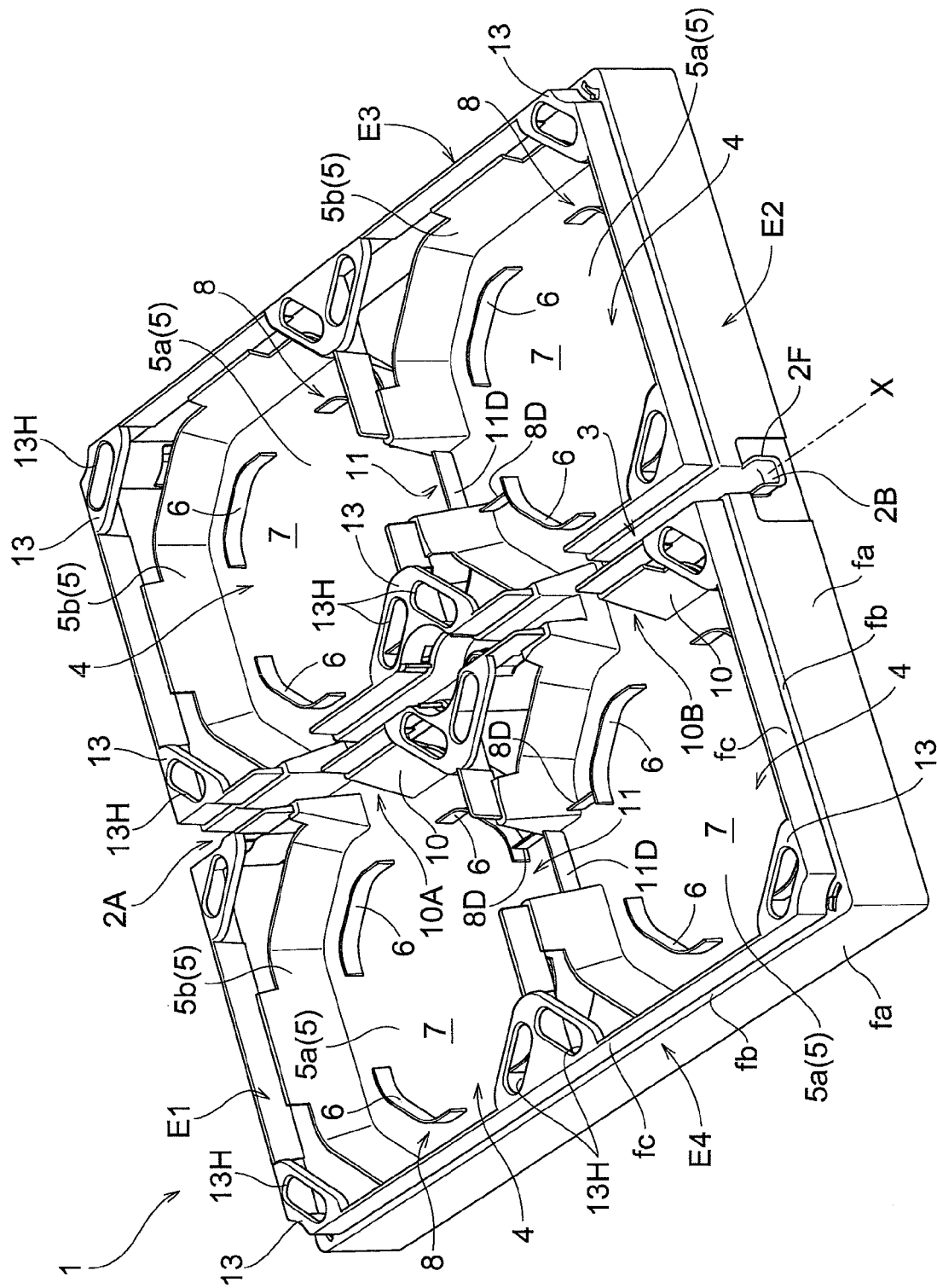
FIG. 2 is a perspective view of a plant cultivation container constituting the plant cultivation device of FIG. 1.

As shown in FIG. 2, each of the plant cultivation containers 1 has an outer shape of an approximate square as a planar view. At a center of a plate-shaped first side member E1 constituting one side of the plant cultivation container 1, a water inlet 2A is provided which is for receiving the plant cultivation water into the plant cultivation container 1. At a center of a second side member E2 opposite to the first side member E1, a water outlet 2B is provided which is for discharging excessive plant cultivation water from the plant cultivation container 1.

An axis X connecting midpoints of the two side members E1,E2 extends at the center of the plant cultivation container 1 in parallel with remaining side members E3,E4, and a linear feed-discharge channel 3 runs along the axis X. The water inlet 2A and the water outlet 2B are positioned at both ends of the feed-discharge channel 3, and a beak-shaped slice 2F projects nearly horizontally from the water outlet 2B.

In FIG. 2, on each of a right side and a left side of the feed-discharge channel 3, two approximate square-shaped plant cultivation sections 4 are arranged along and in parallel with the feed-discharge channel 3. Four in total of the plant cultivation sections 4 collectively form the plant cultivation container 1 having an outer shape of an approximate square as a whole, as a planar view.

Figure 5:
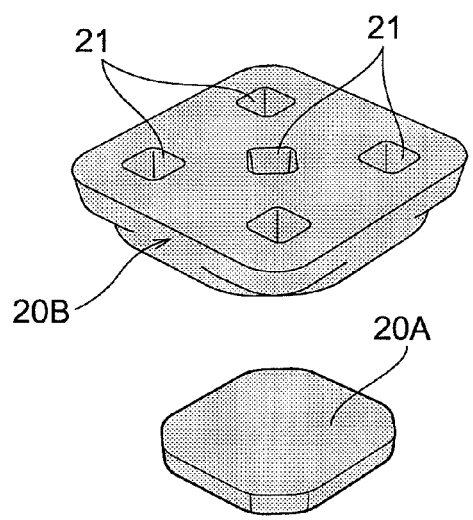
FIG. 5 is a perspective view of a plant cultivation bed material used in the present invention.

The plant cultivation bed material 20 is formed of a porous material having a function of supporting the plant while allowing growth of its root, and a function of absorbing and holding the plant cultivation water necessary for growth. As shown in FIGS. 1 and 5, herein, the plant cultivation bed material 20 includes: a lower bed material 20A for absorbing the fed plant cultivation water; and an upper bed material 20B which is placed on the lower bed material 20A and supports the plant. In the upper bed material 20B, a recess 21 is formed which is for planting a seedling of, for example, flowering plant. The plant cultivation bed material 20 (20A, 20B) used herein is formed of a mixture of urethane, crushed wood chips and the like, and is configured to hold moisture and air in a balanced manner, nearly uniformly from top to bottom, and at the same time, to facilitate the holding of air necessary for the growth of the root.

Figure 3:
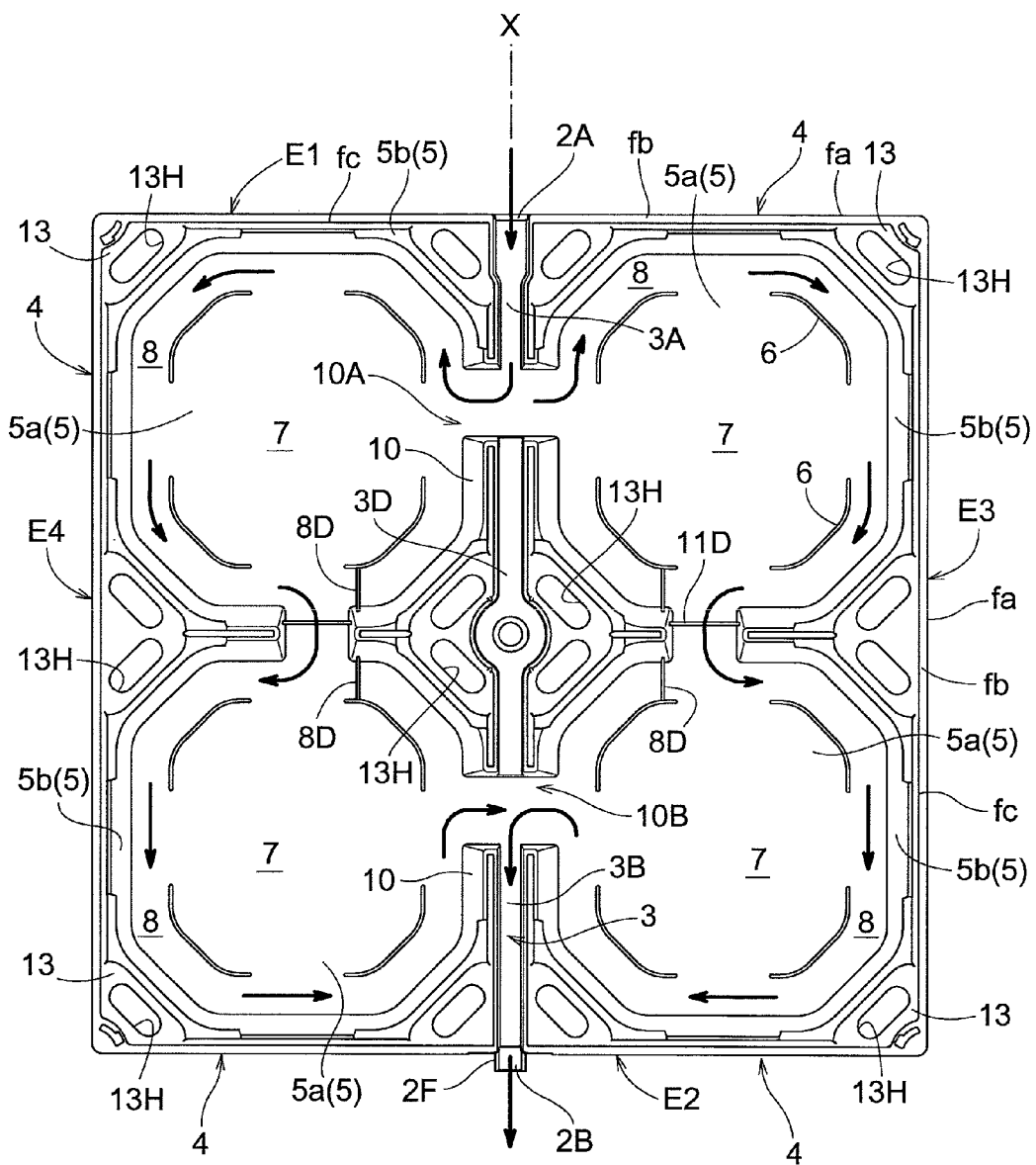
FIG. 3 is a plan view showing an action in the plant cultivation container of FIG. 2.

As shown in FIGS. 2 and 3, each of the plant cultivation sections 4 is provided with a single water reservoir container 5 (one example of water reservoir portion) for pooling the plant cultivation water. Therefore, the feed-discharge channel 3 serves a groove-shaped feed-discharge channel disposed next to one side of each water reservoir container 5, and the two water reservoir containers 5 are arranged on the right and left sides of and next to the feed-discharge channel 3 so that they are opposed across the feed-discharge channel 3. The water reservoir container 5 has eight wall faces 5b extending obliquely upward from an outermost periphery of an octagonal bottom face 5a, to form a mortar shape. The water reservoir container 5 is connected to the side members E1,E2,E3, E4 through upper ends of parts of the wall faces 5b.

Four low plate-shaped projections 6 stand upward at positions closer to the center by a predetermined distance from the outermost periphery of the bottom face 5a of the water reservoir container 5.

An approximately octagonal area inside the plate-shaped projection 6 forms a bed material accommodation part 7 for placing the lower bed material 20A, and an outside of the plate-shaped projection 6 forms a surrounding feed-water channel 8 surrounding an entire circumference of a lower end portion of the lower bed material 20A. In the surrounding feed-water channel 8, the lower bed material 20A is not present, and thus basically the plant cultivation water freely moves to and fro.

It should be noted that, as a planar view, the upper bed material 20B has a larger outer diameter than that of the lower bed material 20A, and when the upper bed material 20B is placed on the lower bed material 20A, an outer periphery of the upper bed material 20B is positioned so as to be nearly fitted into an inner face of the eight wall face 5b of the water reservoir container 5.

Accordingly, beneath the upper bed material 20B, a tunnel-shaped water channel that surrounds an entire circumference of the lower bed material 20A is formed.

Figure 4:
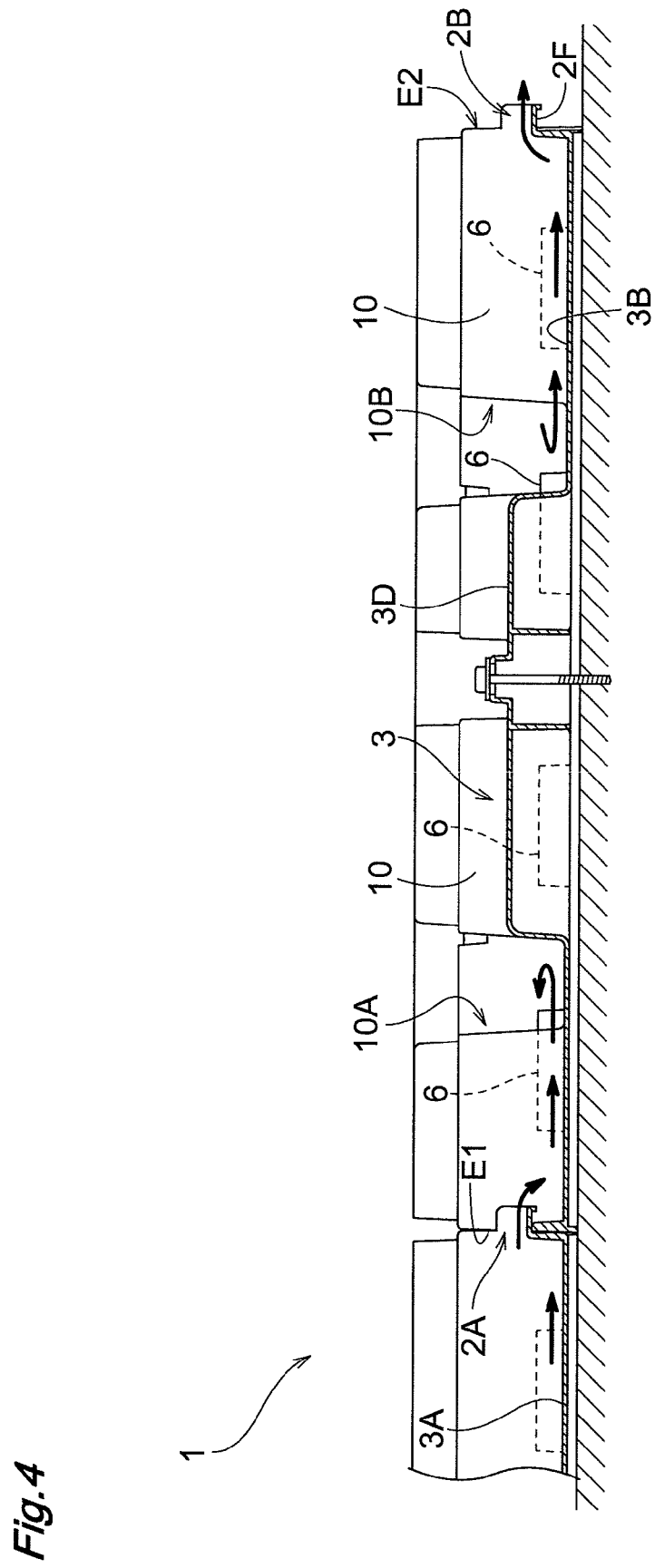
FIG. 4 is a vertical cross-sectional view taken along a feed-discharge channel of the plant cultivation container of FIG. 2.

As shown in FIG. 4, in an intermediate portion in a water flow direction of the feed-discharge channel 3, there is formed a second weir member 3D which divides the feed-discharge channel 3 into a first channel 3A on an upstream side and a second channel 3B on a downstream side, and pools the plant cultivation water to a predetermined depth in the first channel 3A.

In addition, as shown in FIGS. 2-4, between the feed-discharge channel 3 and the water reservoir container 5, there is provided a plate-shaped partition wall 10 for partitioning two regions. The partition wall 10 is provided with: a first opening 10A for allowing the first channel 3A of the feed-discharge channel 3 to communicate with the surrounding feed-water channel 8 of the plant cultivation section 4 on the upstream side; and a second opening 10B for allowing the second channel 3B of the feed-discharge channel 3 to communicate with the surrounding feed-water channel 8 of the plant cultivation section 4 on the downstream side, both openings formed in a shape of cut-out. The second weir member 3D having a certain length extends linearly from a downstream end portion of the first opening 10A to an upstream end portion of the second opening 10B.

Between the water reservoir container 5 on the upstream side and the water reservoir container 5 on the downstream side which are disposed along and in parallel with the feed-discharge channel 3, a connection opening 11 for allowing the plant cultivation water to move to and fro is formed, and in the connection opening 11, a third weir member 11D is formed for pooling the plant cultivation water to a predetermined depth.

A part of each surrounding feed-water channel 8 is provided with a first weir member 8D for controlling a circulation direction of the plant cultivation water entering the surrounding feed-water channel 8 from the water inlet 2A through the first opening 10A or the second opening 10B.

The two first weir members 8D provided in the surrounding feed-water channels 8 of the water reservoir containers 5 on the upstream and downstream sides extend in parallel with the axis X, in the same manner in a front-rear direction across the third weir member 11D, and are arranged symmetrically about the third weir member 11D as a planar view.

Referring to FIG. 3, when the description is made with respect to only the plant cultivation sections 4 on the right side of the axis X, the first weir member 8D provided in the upstream water reservoir container 5 is configured so as to connect a portion near a downstream end portion of the plate-shaped projection 6 located on a lower left side in the drawing with the closest wall face 5b. The first weir member 8D provided in the downstream water reservoir container 5 is configured so as to connect a portion near an upstream end portion of the plate-shaped projection 6 located on an upper left side in the drawing with the closest wall face 5b.

On upper ends of respective four corners of each plant cultivation section 4, respective approximately triangular flanges 13 extend horizontally so as to fill the four corners. Lower faces of the respective flanges 13 are configured to engage with four sides of an upper face of the upper bed material 20B, and thus to function to hold the upper bed material 20B at a proper position.

In addition, in a case where a great number of the plant cultivation containers 1 are connected in four directions, a worker can walk along and on at least a part of the flanges 13 for the purpose of maintenance of the flowering plants during growth. The feed-discharge channel 3 may be used in a closed state in which the channel is closed with a removable rectangular lid (not shown).

FIG. 1 shows two types of connection caps 24,25 for achieving the connection of the plant cultivation containers 1 to one another. The circular connection cap 24 is used for unifying the four plant cultivation containers 1, while the semicircular connection cap 25 is used for unifying the two plant cultivation containers 1. In order to lock lower end portions or the like of the connection caps 24,25, each of the four corner portions of the plant cultivation container 1 has an engagement hole or engagement projection in a shape of a quadrant.

It should be noted that, when the plant cultivation containers 1 are connected in the front-rear direction, i.e. connected in such a manner that the feed-discharge channels 3 are arranged in series, the connection is made in such a manner that the slice 2F provided on the water outlet 2B of the plant cultivation container 1 on the upstream side in the flow direction of the plant cultivation water enters the water inlet 2A of the plant cultivation container 1 on the downstream side.

A relationship in height of the weir members, the plate-shaped projection 6 and the slice 2F, when the plant cultivation container 1 is placed on a horizontal plane, is set as follows: second weir member 3D>slice 2F>third weir member 11D=water inlet 2A>plate-shaped projection 6>first weir member 8D.

Action in Plant Cultivation Container

Referring to FIG. 3, when the feed-water equipment 30 begins to supply the plant cultivation water to the water inlet 2A of the plant cultivation container 1 disposed most upstream, first, the plant cultivation water enters the first channel 3A of the feed-discharge channel 3, hit the second weir member 3D, and is separated to right and left. Through the right and left first openings 10A, the water enters the surrounding feed-water channels 8 (the water reservoir containers 5) of the right and left upstream plant cultivation sections 4. The plant cultivation water that has entered the surrounding feed-water channel 8 flows through either or both of the upstream side or the downstream side of the channel in accordance with a degree of a slope where the container is placed. However, after the plant cultivation water flowing through the downstream side reaches the first weir member 8D disposed in the surrounding feed-water channel 8, the water flowing through the upstream side becomes predominant, flows clockwise around outer circumferences of the lower bed material 20A and the plate-shaped projections 6 along the surrounding feed-water channel 8, and reaches the first weir member 8D, to thereby rapidly surround the entire circumference of the lower bed material 20A with the plant cultivation water. In this manner, the plate-shaped projection 6 also serves as a guide member for guiding the plant cultivation water in a given circulation direction. The lower bed material 20A immediately begins to absorb the plant cultivation water, but when the plant cultivation water is supplied at a rate above a speed of water absorption of the lower bed material 20A, the water overflows above the third weir member 11D and moves from the connection opening 11 to the downstream plant cultivation section 4.

The plant cultivation water that has entered the surrounding feed-water channel 8 on the downstream plant cultivation section 4 flows clockwise around the outer circumferences of the lower bed material 20A and the plate-shaped projections 6 along the surrounding feed-water channel 8 due to the presence of the first weir member 8D disposed on the downstream side of the channel, and reaches the first weir member 8D, to thereby rapidly surround the entire circumference of the lower bed material 20A with the plant cultivation water. A part of the plant cultivation water that has surrounded the lower bed material 20A enters the second channel 3B. The lower bed material 20A immediately begins to absorb the plant cultivation water, but when the plant cultivation water is supplied from the upstream plant cultivation section 4 at a rate above the speed of water absorption by the lower bed material 20A, the water overflows from the slice 2F of the water outlet 2B and flows into the water inlet 2A of the downstream plant cultivation container 1.

Such an action of the plant cultivation water is performed nearly symmetrically in the right and left plant cultivation sections 4 across the feed-discharge channel 3.

It should be noted that, a controller 33 may be set in such a manner that the extra plant cultivation water is not discharged from the slice 2F of the plant cultivation container 1 disposed most downstream. Alternatively, the water outlet 2B of the plant cultivation container 1 disposed most downstream may be closed with a special plug member.

Feed-Water Equipment

As shown in FIG. 1, the feed-water equipment 30 includes: piping 31 for supplying the plant cultivation water to the water inlet 2A of the plant cultivation container 1 disposed most upstream; an electromagnetic valve 32 disposed between waterworks and the piping 31; a first moisture sensor S1 inserted into the lower bed material 20A positioned most downstream; a second moisture sensor S2 inserted into the upper bed material 20B; and the controller 33 for switching opening and closing of the electromagnetic valve 32 based on detection results of the moisture sensors S1,S2.

Figure 6:
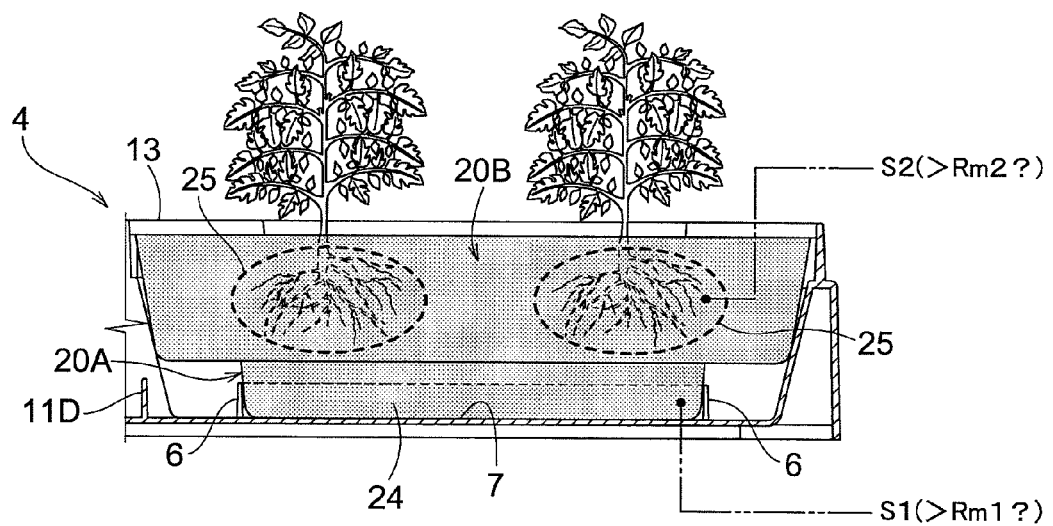
FIG. 6 is a vertical cross-sectional view of a relevant part illustrating an installation position of a first moisture sensor.
Figure 7:
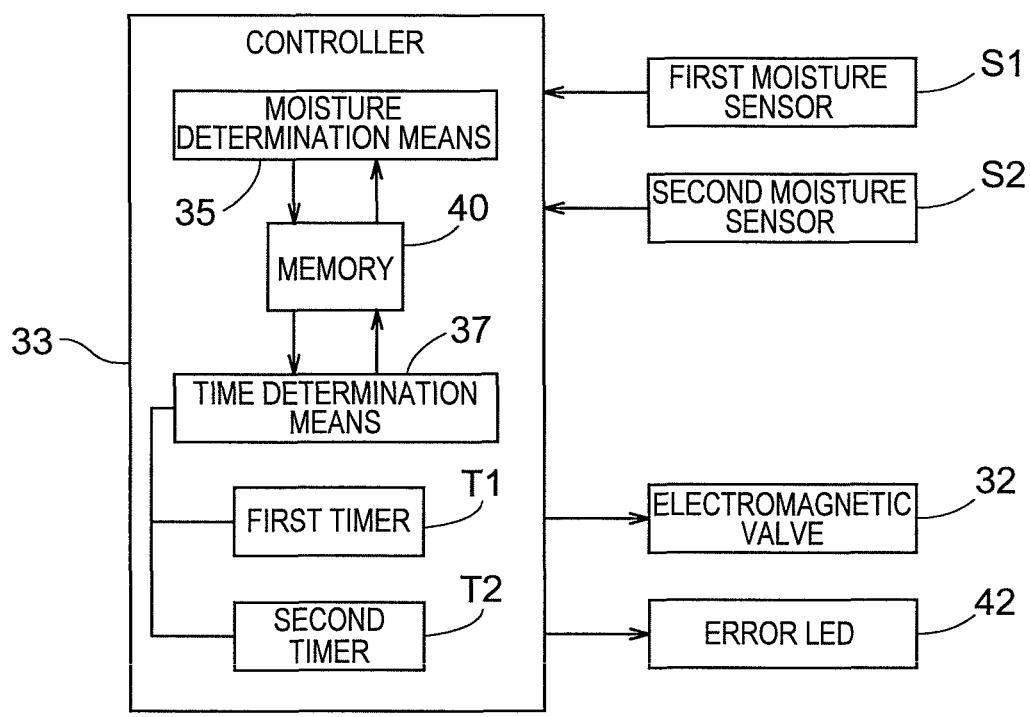
FIG. 7 is a block diagram of a controller of the plant cultivation device according to the present invention.

As illustrated in FIG. 6, a detecting element of the first moisture sensor S1 is installed in the most downstream lower bed material 20A, and is especially inserted into an approximately central portion in a vertical direction of an immersed part 24 immersed in the plant cultivation water supplied by the feed-water equipment 30. On the other hand, a detecting element of the second moisture sensor S2 is installed in the upper bed material 20B, and is especially inserted into a part around a growth part 25 where the root of the plant is received.

For each of the first moisture sensor S1 and the second moisture sensor S2, a dielectric soil moisture sensor is used which is capable of measuring a volume water content of soil or artificial plant cultivation bed material with high responsiveness and with high accuracy. The dielectric soil moisture sensor utilizes a fact that a dielectric constant of soil is approximately proportional to a soil moisture amount since relative dielectric constants among water, soil particles and air are different from one another to a large degree. The dielectric soil moisture sensor applies a voltage between a pair of electrodes and measures the volume water content based on a dielectric constant of the soil or artificial plant cultivation bed material disposed between the electrodes.

It should be noted that, with respect to the first moisture sensor S1 for detecting a moisture condition of the immersed part 24, there may be used, instead of the dielectric soil moisture sensor, a common level sensor for detecting the water amount in the water reservoir container 5 in terms of a water surface level.

The controller 33 is configured to open the electromagnetic valve 32 when values detected by both the first moisture sensor S1 and the second moisture sensor S2 are below respective reference values Rm1,Rm2, and to close the electromagnetic valve 32 when a value detected by either the first moisture sensor or the second moisture sensor is above the corresponding reference value Rm1 or Rm2. In addition, the controller 33 is configured to blink an error LED 42 and close the electromagnetic valve 32 when a continuous opening time of the electromagnetic valve 32 (first time period) exceeds a predetermined base time, and to blink the error LED 42 when a continuous drying time (second time period) during which both of the two moisture sensors S1,S2 continuously show values below the respective reference values Rm1,Rm2, which indicate deficiency of water, exceeds a predetermined base time.

For this purpose, the controller 33 includes: a first timer T1 for measuring the continuous opening time of the electromagnetic valve 32 (first time period); a second timer T2 for measuring the continuous drying time (second time period) during which the two moisture sensors S1,S2 continuously show values below the respective reference values Rm1,Rm2, which indicate deficiency of water; a moisture determination means 35 for determining whether or not moisture detection values by the moisture sensors S1,S2 exceed the respective reference moisture values Rm1,Rm2; a time determination means 37 for determining whether or not measurement results by the timers T1, T2 exceed respective base times Rt1,Rt2; and a memory 40 for storing the reference moisture values Rm1,Rm2 and the base times Rt1,Rt2.

It should be noted that it is sufficient if the first moisture sensor S1 can determine whether or not a satisfactory amount of the plant cultivation water is present in the water reservoir container 5 on which the immersed part 24 of the plant cultivation bed material 20 is placed, or alternatively, whether or not the immersed part 24 is fully moistened with the plant cultivation water. Therefore, the reference value Rm1 may be set, for example, to a value corresponding to 50% or more in terms of volume water content.

It is desired that the second moisture sensor S2 determines whether or not the growth part 25 of the plant cultivation bed material 20 retains an appropriate amount of moisture. Thus, though it varies depending on the type of the plant, the reference value Rm2 may be set, for example, to a value within a range of 10-50%, preferably, a range of 20-35%.

Action of Controller

Hereinbelow, an embodiment of an opening-closing operation of the electromagnetic valve 32 by the controller 33 will be described with reference to the flow chart of FIG. 8.

At the beginning of the operation by the controller 33, the electromagnetic valve 32 is in a closed state (step #01). After 30 seconds of standby time (step #02), the moisture detection values by the moisture sensors S1,S2 are compared with the respective reference moisture values Rm1,Rm2 (steps #03 and #04). When both of the moisture detection values are above the respective reference moisture values Rm1,Rm2 (two Yes's), after one hour of standby time (step #05), the process returns to the step #02.

On the other hand, in the steps #03 and #04, when both of the moisture detection values are below the respective reference moisture values Rm1,Rm2 (two No's), the electromagnetic valve 32 is switched to an opened state (step #06), the moisture detection values by the moisture sensors S1,S2 remain to be compared with the respective reference moisture values Rm1,Rm2 (steps #07 and #09).

In the steps #07 and #09, when one of the moisture detection values of the two moisture sensors S1,S2 is above the corresponding reference moisture value Rm1 or Rm2 (at least one Yes), the electromagnetic valve 32 is closed (step #08), and then the process returns to the step #05.

On the other hand, in the steps #07 and #09, when both of the moisture detection values are below the respective reference moisture values Rm1,Rm2 (two No's), it is determined whether or not the continuous opening time of the electromagnetic valve 32 (first time period) measured by the first timer T1 exceeds the first base time Rt1 (for example 6 hours) (step #10), and when it is equal to or below the first base time Rt1 (No), the process advances to a step #15 in which the continuous drying time (second time period) is compared with the base time Rt2.

In the step #15, it is determined whether or not the continuous drying time (second time period, drying time) is below the second base time Rt2 (for example, 12 hours), and when it is equal to or below the second base time Rt2 (Yes), the procedure returns to the step #07.

To the contrary, when the continuous drying time (second time period, drying time) is above the second base time Rt2 in the step #15 (No), error information including date and time of occurrence, the continuous drying time or the like is stored in the memory 40 (step #16), and while the error LED 42 is blinked in a pattern B (e.g. once every 4 seconds) (step #17), the process returns to the step #07.

It should be noted that, in the step #10, when the continuous opening time of the electromagnetic valve 32 (first time period) exceeds the first base time Rt1 (Yes), error information including the date and time of occurrence, the continuous opening time or the like is stored in the memory 40 (step #11) and the electromagnetic valve 32 is closed (step #12). While the error LED 42 is blinked in a pattern A (e.g. once every 2 seconds) (step #13), after 24 hours of standby time (step #14), the process returns to the step #02.

Figure 8:
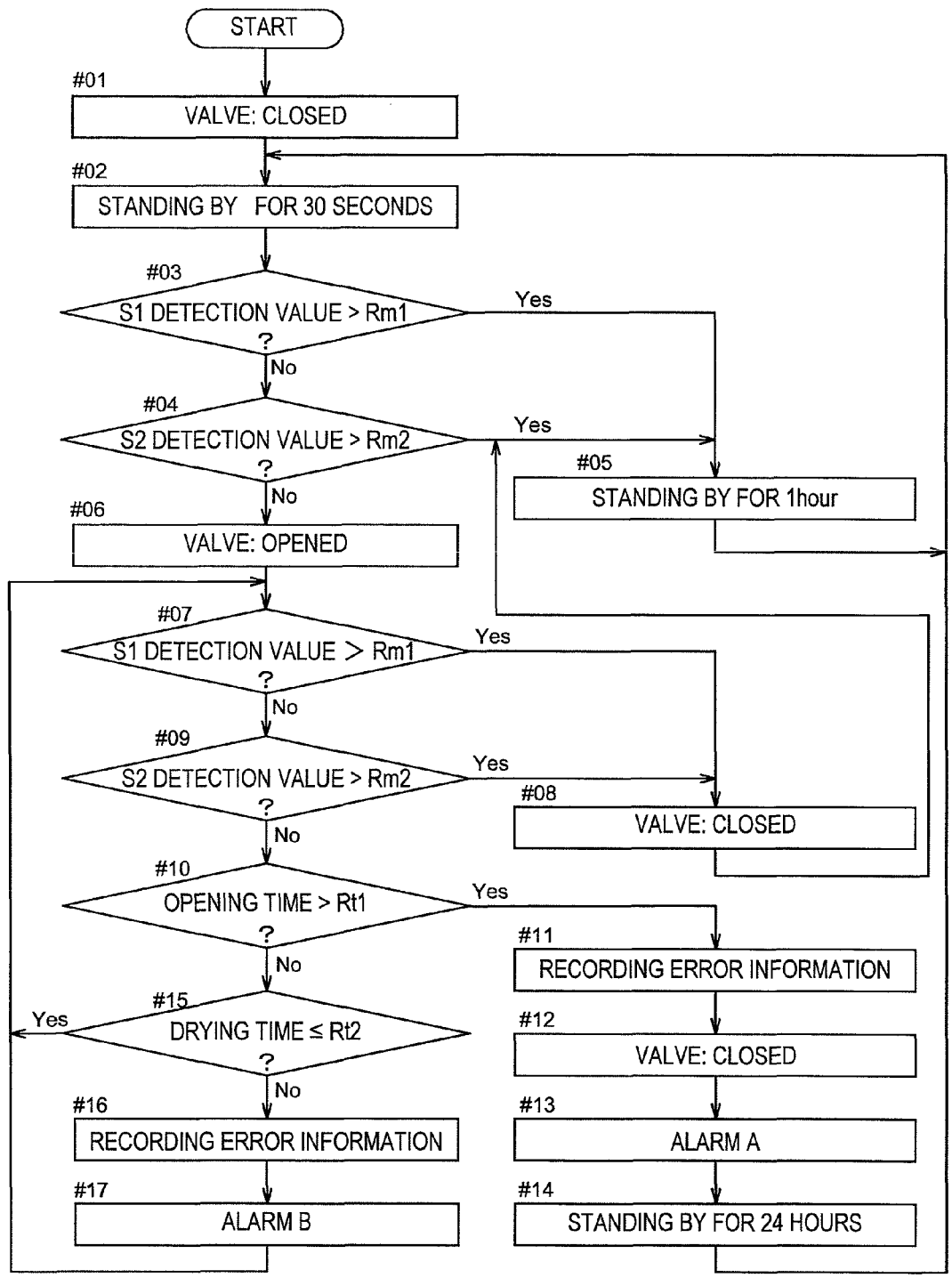
FIG. 8 is a flow chart of an example of a watering process in the plant cultivation device according to the present invention.

In a case where the device is used in an arid region, such as desert region, in a case where the device is used during a dry season in a tropical zone, or in a case where the installation position of the first moisture sensor S1 is set low, it is preferable that the standby time which is set to 24 hours in the step #14 in the flow chart of FIG. 8 is appropriately shortened. In addition, the standby time in the step #14 can be appropriately altered depending on the characteristics of the plant to be grown.

OTHER EMBODIMENTS

The first base time Rt1 to be compared for determining the continuous opening time of the electromagnetic valve 32 (first time period) may not be a fixed value, and alternatively, for example, it may be a time period twice as long as the previous continuous opening time (normally), or a time period twice as long as the longest continuous opening time after initialization of the controller 33. Instead of the error LED 42, an alarming means, such as buzzer, may be used.

INDUSTRIAL APPLICABILITY

The present invention is applicable as a plant cultivation device including: a plant cultivation container having a water reservoir portion for pooling plant cultivation water; a water-absorbing plant cultivation bed material disposed in the plant cultivation container; and a feed-water device for supplying the plant cultivation water to the water reservoir portion, in which the soil (plant cultivation bed material) is unlikely to be in a state with excessive moisture, burying the moisture sensor is easy, and a detected moisture amount to start the watering and a water amount to be used per watering are easily determined.

REFERENCE SIGNS LIST

Rm1 Reference value (for first moisture sensor)
Rm2 Reference value (for second moisture sensor)
S1 First moisture sensor (immersed part)
S2 Second moisture sensor (plant cultivation part)
T1 First timer (continuous opening time)
T2 Second timer (continuous drying time)
1 Plant cultivation container
5 Water reservoir container (water reservoir portion)
20 Plant cultivation bed material
24 Immersed part
25 Growth part
30 Feed-water equipment
31 Piping
32 Electromagnetic valve
33 Controller
35 Moisture determination means
37 Time determination means
40 Memory
42 Error LED

The invention claimed is:
1. A plant cultivation device comprising:
a plant cultivation container having a water reservoir portion for pooling plant cultivation water;
a water-absorbing plant cultivation bed material disposed in the plant cultivation container;
a feed-water device for supplying the plant cultivation water to the water reservoir portion;
a first moisture sensor for detecting a moisture amount around an immersed part of the plant cultivation bed material immersed in the plant cultivation water of the water reservoir portion or a water amount in the water reservoir portion, the first moisture sensor being positioned around the immersed part of the plant cultivation bed material or in the water reservoir portion;

a second moisture sensor for detecting a moisture amount around a growth part of the plant cultivation bed material where a root of a plant is received, the second moisture sensor being positioned around the growth part of the plant cultivation bed material where the root of the plant is received; and a controller for allowing the feed-water device to supply water when values detected by both the first moisture sensor and the second moisture sensor are below respective reference values, and for stopping water supply when a value detected by one of the first moisture sensor and the second moisture sensor is above the corresponding reference value.

2. The plant cultivation device according to claim 1, wherein the controller comprises a first time period measuring means for measuring a time period during which water is continuously supplied by the feed-water device, and when a time period measured by the first time period measuring means exceeds a predetermined base time, forced water stop is performed in which the water supply is stopped.

3. The plant cultivation device according to claim 2, wherein the controller comprises a second time period measuring means for measuring a continuous drying time during which both of the first moisture sensor and the second moisture sensor continuously detect moisture detection values below respective reference values, and when a time period measured by the second time period measuring means exceeds a predetermined base time, a warning is issued.

4. The plant cultivation device according to claim 1, wherein the controller comprises a second time period measuring means for measuring a continuous drying time during which both of the first moisture sensor and the second moisture sensor continuously detect moisture detection values below respective reference values, and when a time period measured by the second time period measuring means exceeds a predetermined base time, a warning is issued.

5. A feed-water control method in a plant cultivation device comprising: a plant cultivation container having a water reservoir portion for pooling plant cultivation water; a water-absorbing plant cultivation bed material disposed in the plant cultivation container; and a feed-water device for supplying the plant cultivation water to the water reservoir portion, in which a supply of the plant cultivation water by the feed-water device is controlled, the method comprising:

a step of installing a first moisture sensor for detecting a moisture amount around an immersed part of the plant cultivation bed material immersed in the plant cultivation water of the water reservoir portion or a water amount in the water reservoir portion, the first moisture sensor being positioned around the immersed part of the plant cultivation bed material or in the water reservoir portion;

a step of installing a second moisture sensor for detecting a moisture amount around a growth part of the plant cultivation bed material where a root of a plant is received, the second moisture sensor being positioned around the growth part of the plant cultivation bed material; and a step of allowing the feed-water device to supply water when values detected by both the first moisture sensor and the second moisture sensor are below respective reference values, and for stopping water supply when a value detected by either the first moisture sensor or the second moisture sensor is above the corresponding reference value.

6. A plant cultivator comprising:

a plant cultivation container having a water reservoir portion to pool plant cultivation water;

a water-absorbing plant cultivation bed material disposed in the plant cultivation container;

a feed-water device to supply the plant cultivation water to the water reservoir portion;

a first moisture sensor to detect a moisture amount around an immersed part of the plant cultivation bed material immersed in the plant cultivation water of the water reservoir portion or a water amount in the water reservoir portion, the first moisture sensor being positioned around the immersed part of the plant cultivation bed material or in the water reservoir portion;

a second moisture sensor to detect a moisture amount around a growth part of the plant cultivation bed material where a root of a plant is received, the second moisture sensor being positioned around the growth part of the plant cultivation bed material where the root of the plant is received; and a controller to allow the feed-water device to supply water when values detected by both the first moisture sensor and the second moisture sensor are below respective reference values, and to stop water supply when a value detected by one of the first moisture sensor and the second moisture sensor is above the corresponding reference value.

7. The plant cultivator according to claim 6, wherein the controller comprises a first time period gauge to measure a time period during which water is continuously supplied by the feed-water device, and when a time period measured by the first time period gauge exceeds a predetermined base time, forced water stop is performed in which the water supply is stopped.

8. The plant cultivator according to claim 7, wherein the controller comprises a second time period gauge to measure a continuous drying time during which both of the first moisture sensor and the second moisture sensor continuously detect moisture detection values below respective reference values, and when a time period measured by the second time period gauge exceeds a predetermined base time, a warning is issued.

9. The plant cultivator according to claim 6, wherein the controller comprises a second time period gauge to measure a continuous drying time during which both of the first moisture sensor and the second moisture sensor continuously detect moisture detection values below respective reference values, and when a time period measured by the second time period gauge exceeds a predetermined base time, a warning is issued.

10. A feed-water control method in a plant cultivator comprising: a plant cultivation container having a water reservoir portion to pool plant cultivation water; a water-absorbing plant cultivation bed material disposed in the plant cultivation container; and a feed-water device to supply the plant cultivation water to the water reservoir portion, in which a supply of the plant cultivation water by the feed-water device is controlled, the method comprising:

installing a first moisture sensor to detect a moisture amount around an immersed part of the plant cultivation bed material immersed in the plant cultivation water of the water reservoir portion or a water amount in the water reservoir portion, the first moisture sensor being positioned around the immersed part of the plant cultivation bed material or in the water reservoir portion;

installing a second moisture sensor to detect a moisture amount around a growth part of the plant cultivation bed material where a root of a plant is received, the second moisture sensor being positioned around the growth part of the plant cultivation bed material; and allowing the feed-water device to supply water when values detected by both the first moisture sensor and the second moisture sensor are below respective reference values, and for stopping water supply when a value detected by either the first moisture sensor or the second moisture sensor is above the corresponding reference value.

\* \* \* \* \*